(12) United States Patent
Ashley-Rollman et al.

(10) Patent No.: US 8,977,950 B2
(45) Date of Patent: Mar. 10, 2015

(54) TECHNIQUES FOR SELECTION AND MANIPULATION OF TABLE BOARDERS

(75) Inventors: Caitlin Ashley-Rollman, Redmond, WA (US); Jessica Best, Bellevue, WA (US); Levent Kartaltepe, Bellevue, WA (US); Tristan Davis, Redmond, WA (US); Charles Walker, Sammamiash, WA (US); Susan Baker, Snohomish, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/252,406

(22) Filed: Oct. 4, 2011

(65) Prior Publication Data

US 2013/0086461 A1    Apr. 4, 2013

(51) Int. Cl.
G06F 17/24    (2006.01)
(52) U.S. Cl.
CPC .................................. G06F 17/245 (2013.01)
USPC ......................................................... 715/217
(58) Field of Classification Search
CPC ....................................................... G06F 17/24
USPC ......................................................... 715/217
See application file for complete search history.

(56) References Cited

U.S. PATENT DOCUMENTS

| | | | |
|---|---|---|---|
| 6,988,241 B1* | 1/2006 | Guttman et al. | 715/220 |
| 2006/0061779 A1 | 3/2006 | Chen et al. | |
| 2007/0061714 A1* | 3/2007 | Stuple et al. | 715/529 |
| 2009/0217206 A1* | 8/2009 | Liu et al. | 715/846 |
| 2010/0299587 A1 | 11/2010 | Swett | |

OTHER PUBLICATIONS

"Borders, backgrounds, and boundaries", Retrieved at <<http://wiki.services.openoffice.org/wiki/Docunnentation/OOo3_User_Guides/Writer_Guide/Borders_backgrounds_boundaries>>, Retrieved Date: Jul. 8, 2011, pp. 5.
"Multi-Column Resizing", Retrieved at <<http://help.infragistics.com/Help/NetAdvantage/Silverlight/2010.2/CLR4.0/html/SL_xamGrid_Multi_Column_Resizing.html>>, Retrieved Date: Jul. 8, 2011, p. 1.
"EMPower", Retrieved at <<https://docs.rice.edu/confluence/download/attachments/6783727/all06.pdf?version=1&modificationDate=1189543397579>>, Jun. 2002, pp. 42.
"Format a Table Border in PowerPoint", Retrieved at <<http://www.homeandlearn.co.uk/powerpoint/powerpoint_p3s23.html>>, Retrieved Date: Jul. 8, 2011, pp. 2.
"Google-web-toolkit-incubator", Retrieved at <<http://code.google.com/p/google-web-toolkit-incubator/wiki/ScrollTable>>, Feb. 4, 2010, pp. 13.
"How to: Format a Border, Line, or Gridline", Retrieved at <<http://msdn.microsoft.com/en-us/library/aa337351%28v=sql.100%29.aspx>>, Retrieved Date: Jul. 8, 2011, pp. 2.

* cited by examiner

*Primary Examiner* — Kavita Padmanabhan
*Assistant Examiner* — Tionna Burke
(74) *Attorney, Agent, or Firm* — Jessica Meyers; Leonard Smith; Micky Minhas

(57) ABSTRACT

Techniques to select and manipulate table borders as discrete objects are described. In particular, a table border may be selected without having to select a cell that includes the desired border. In one embodiment, for example, a technique may include detecting a selector in proximity to a border in a table. The border in proximity to the selector may be highlighted visually on a display to show which part of the table border may be selected. A selection may cause the highlighted border to be selected. The now-selected border may then be manipulated. Other embodiments are described and claimed.

17 Claims, 9 Drawing Sheets

700

```
RECEIVE A SELECTION OF A BORDER IN A TABLE
702
```

```
DISPLAY A VISUAL INDICATION THAT THE SELECTED
BORDER IS IN THE SELECTED STATE
704
```

```
RECEIVE A SELECTION OF AN OPERATION ON THE
SELECTED BORDER
706
```

```
APPLY THE SELECTED OPERATION TO THE SELECTED
BORDER
708
```

*FIG. 7*

TECHNIQUES FOR SELECTION AND MANIPULATION OF TABLE BOARDERS

BACKGROUND

Tables may be useful tools for organizing and presenting data, for example, in presentations, documents, and spreadsheets. The effectiveness of a table may be enhanced by formatting various aspects of the table, such as the cells and the borders. Borders may also be applied to other aspects of documents, such as around paragraphs, images and pages. In some cases, method of selecting particular borders to manipulate can be challenging and counter-intuitive. Unexpected results from selections may frustrate the user experience. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques for the manipulation of table borders. Some embodiments are particularly directed to techniques for the selection and manipulation of table borders as discrete objects. In particular, a table border may be selected without having to select a cell that includes the desired border. In one embodiment, for example, a technique may include detecting a selector, such as a pointer cursor, in proximity to a border in a table. The border in proximity to the selector may be highlighted visually on a display to show which part of the table border may be selected. A selection, such as a mouse button single-click, may cause the highlighted border to be selected. The now-selected border may then be manipulated. The manipulations may include operations such as moving, deleting, and changing color, line weight and/or line style. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 7 illustrates an embodiment of a logic flow.

DETAILED DESCRIPTION

Various embodiments are directed to systems and techniques for selection and manipulation of borders. While the description herein refers primarily to table border, it is understood that borders can be applied to other items, such as paragraphs, images and pages, charts and other components of electronically generated documents. The methods of selection and formatting described herein are not limited to tables, and are also applicable to these other items.

Conventionally, when a user wishes to select a table border, the user may have to select the cells having the desired table border first. As used herein, the term "cell" may refer to any piece of content which may have one or more borders applied to it. It may be difficult to identify which cells to select, particularly if a border has previously been modified. The user must identify, for example, whether to select a cell for its top border, or the cell above for its bottom border. The user may then select the operation to apply to the border of the selected cells. If the initial cell selection was incorrect, the result may be unexpected and the user may have to restart the selection process. Other table formatting methods require the user to select the operation first, such as a color change, and then identify the borders on which to operate. This method is generally counter-intuitive because most other formatting changes, or deletion and moving changes, begin with selecting the object and then selecting the operation.

Various embodiments allow a border to be selected independently of the cells. Further, embodiments provide visual guidance to a user to indicate what border they are able to select from a current selector position, and to indicate which border is selected. As a result, the embodiments can improve efficiency and a user experience.

Figure 1:
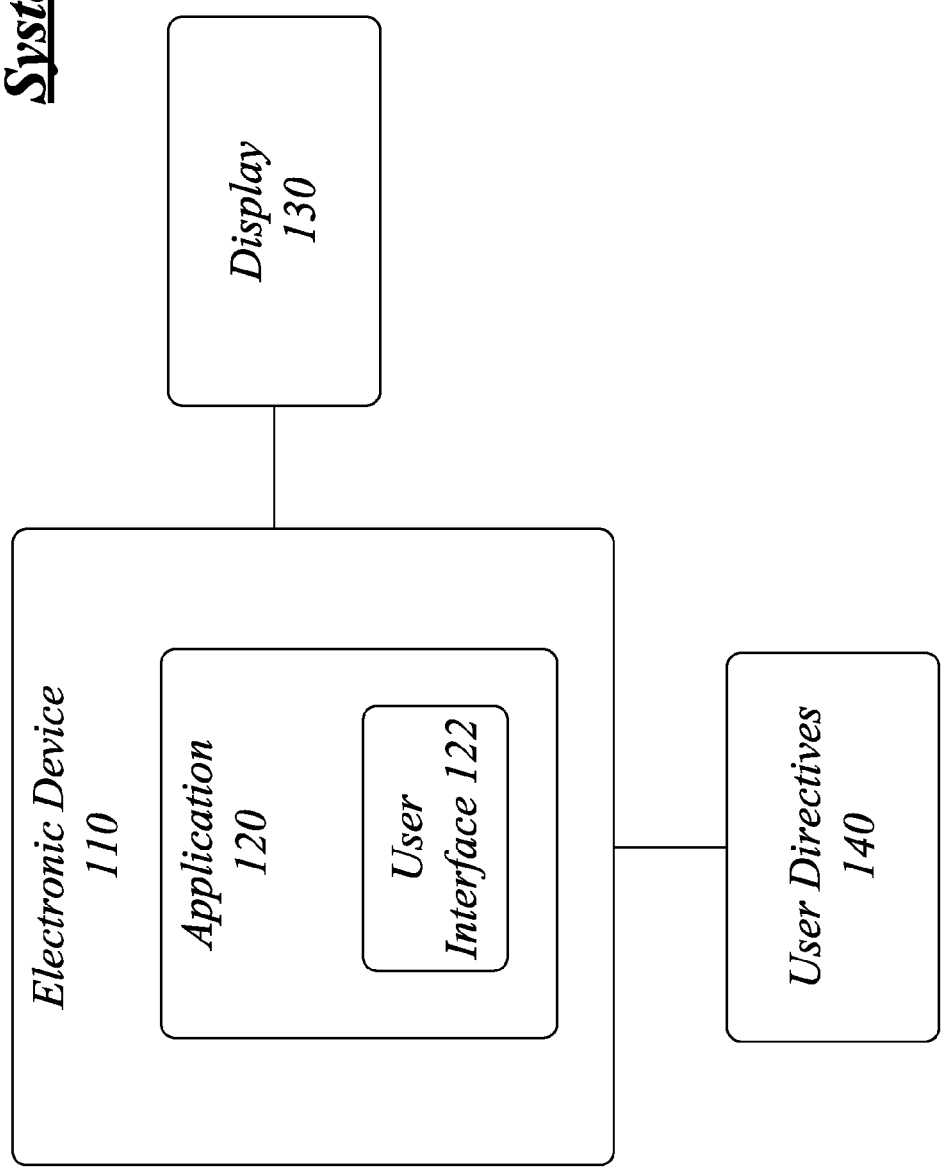
FIG. 1 illustrates an embodiment of a system for the selection and manipulation of table borders.

FIG. 1 illustrates a block diagram for a system 100 for selection and manipulation of table borders. In one embodiment, for example, the system 100 may comprise a computer-implemented system 100 having multiple components, such as electronic device 110 and display 130. As used herein the terms "system" and "component" are intended to refer to a computer-related entity, comprising either hardware, a combination of hardware and software, software, or software in execution. For example, a component can be implemented as a process running on a processor, a processor, logic circuitry, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented with an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

System 100 may include an electronic device 110. Electronic device 110 may include an application 120. Application 120 may include program instructions operative on the processing or logic circuitry of electronic device 110. Application 120 may include operations for making, viewing, and manipulating tables. For example, application 120 may be a word processing application, a spreadsheet application, a computer assisted design (CAD) application, a web browsing application, a drawing application, and so forth. In some embodiments, application 120 may be a client-side application in communication with an application hosted on a remote server, where the hosted application provides an interface to allow the client-side application to make, view and manipulate tables. The embodiments are not limited to these examples.

Application 120 may include a user interface 122. User interface 122 may generate the visual representation of a table and provide selection operations and manipulation operations. Examples of embodiments of user interface 122 are illustrated below in FIGS. 3-6.

In various embodiments, system 100 may include a display 130. Display 130 may be a built-in component of electronic device 110 or may be a separate device communicatively coupled to electronic device 110. Display 130 may be operative to display the tables and user interfaces provided by application 120.

In various embodiments, electronic device 110 may receive user directives 140, for example, via a keyboard, mouse, track pad, touchpad, motion detector, or other input devices. User directives 140 may include the movement of a selector, such as a cursor; button inputs from a selector, e.g. a mouse right button click; keystrokes from a keyboard; hand motions, and so forth. User directives 140 may include directive related to table creation, selection and manipulation. Electronic device 110 may provide user directive information to application 120 to allow application 120 to detect user activities with relation to a displayed table.

Figure 2:
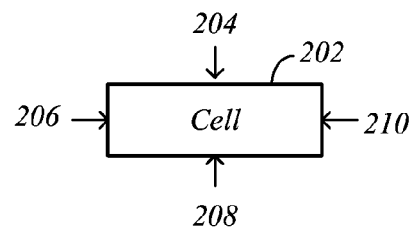
FIG. 2 illustrates an embodiment of a table cell.

FIG. 2 illustrates an example of a cell 200. Cell 200 may comprise any piece of content which may have one or more borders applied to it. Cell 200 may include a border 202 that comprises the perimeter of the cell. Border 202 may be comprised of sub-borders. For example, border 202 may include a top border 204, a left border 206, a bottom border 208 and a right border 210. A cell may have diagonal borders (not shown), for example, from the top left corner to the bottom right corner, or from the bottom left corner to the top right corner. Note that while the examples described herein refer generally to a four-sided cell, other shapes for cells may be used. The border for a cell of a non-rectangular shape may comprise the perimeter of the shape. The sub-borders may correspond to the sides of the cell. A hexagonal cell, for example, may have six sub-borders. A circular cell may have only one border corresponding to its circumference. Cell 200 may be a table cell. In an embodiment, cell 200 may represent a border around another type of document component, such as a border around a paragraph, an image, a chart, a page, and so forth.

Figure 3:
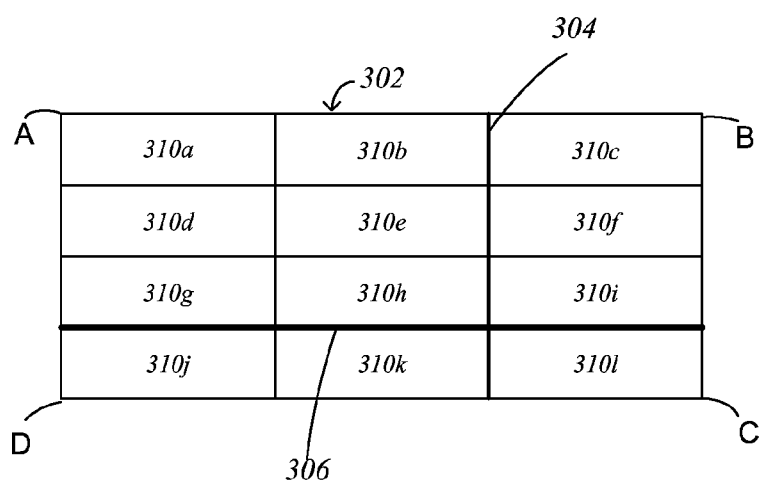
FIG. 3 illustrates an embodiment of a table.

FIG. 3 illustrates an example of a table 300. Table 300 may include a plurality of cells, such as cell 200. In the illustrated example, table 300 has twelve cells, labeled 310a-310l. In addition to cell borders, a table may have table borders. For example, table 300 may have an outside border 302, which includes the perimeter of table 300, e.g. the edges AB, BC, CD, and DA. Table 300 may also have inside borders, such as inside vertical border 304, and inside horizontal border 306. Note that the lines depicting borders 304 and 306 are darkened for clarity and emphasis only.

Conventionally, a table border may potentially be described in multiple ways. For example, inside vertical border 304 may be described as the right borders of cells 310b, 310e, 310h, and 310k. Inside vertical border may also be described as the left borders of 310c, 310f, 310i, and 310l. Inside vertical border 301 could also be described as a combination of left and right borders from cells 310b, 310e, 310h, 310k, 310c, 310f, 310i, and 310l. Conventionally, a user would have to remember which set of cells were selected to obtain the selection of inside vertical border 304. Embodiments allow a table border to be selected independently of the cells that may define the borders.

Figure 4A:
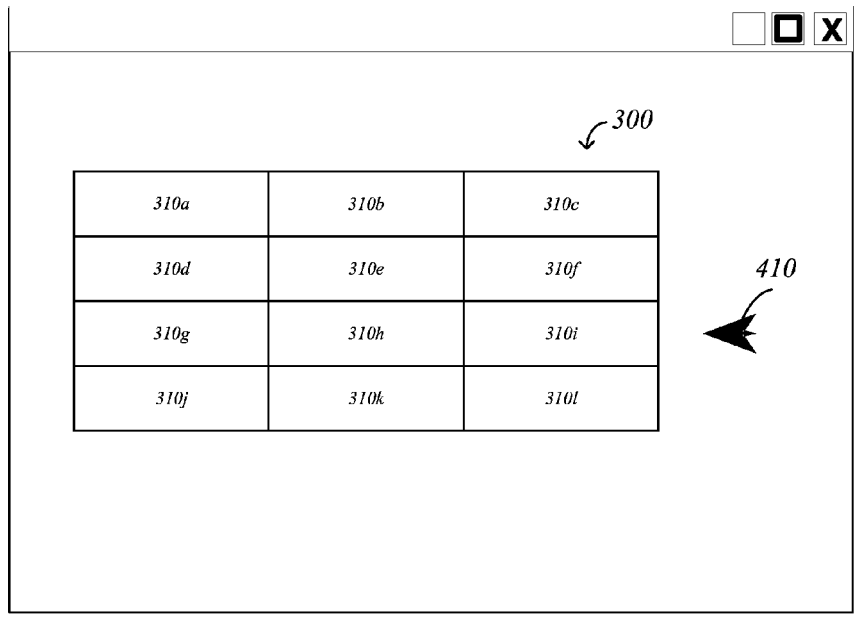
FIG. 4A illustrates an embodiment of table prior to border selection.

FIG. 4A illustrates an example of a user interface 400 displaying table 300, prior to any border selection. User interface 400 may be a component of application 120. User interface 400 also shows a selector 410. Selector 410 may be a cursor that corresponds to a mouse position, a finger contact position on a touch pad or track pad, or other input device. Generally, selector 410 may indicate visually where on user interface 400 an action may take place. Selector 410 may be controlled by a user and may send user directives to electronic device 110 as a result of the user control. Returning to FIG. 4A, selector 410 is too far away from table 300 to trigger any table border selection actions.

Figure 4B:
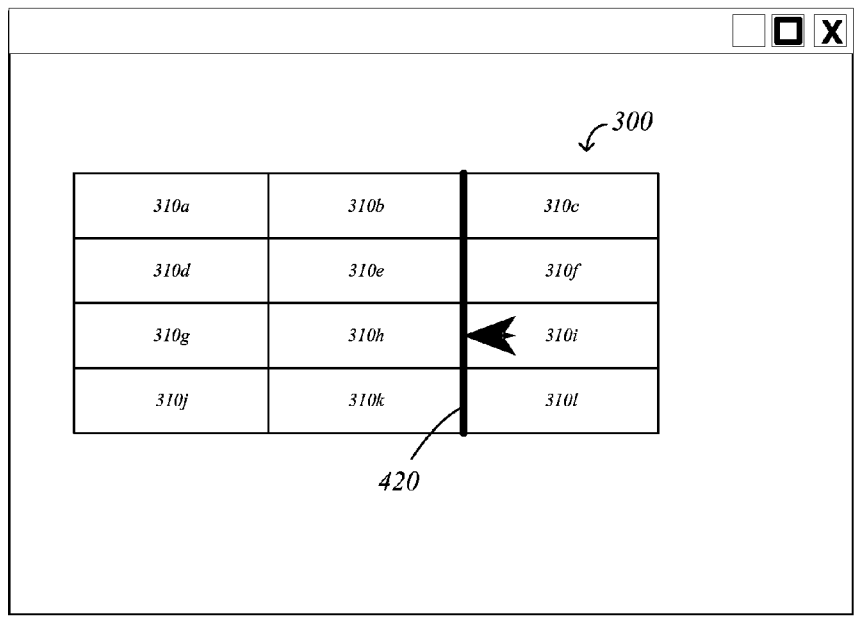
FIG. 4B illustrates an embodiment of table during border selection.

FIG. 4B illustrates user interface 400 displaying table 300 as selector 410 approaches a table border 420. When selector 410 is within a specified distance of a table border, user interface 400 may highlight the table border visually, shown as a thick line. The specified distance may be defined, for example, in a number of pixels away from a table border, a relative distance to a table border, or other methods of specifying distance. Methods of highlighting visually may include any methods that change the appearance of the border relative to the other borders, for example, changing the color of the border, changing the line weight, also referred to as thickness, or changing the style of the line. Note that at this point, the table border is not in a selected state. Instead, user interface 400 is showing to the user the table border that can be selected from the current selector position.

In an embodiment, a default border may be highlighted when the selector proximity is detected. For example, in FIG. 4B, all of inside vertical border 420 is highlighted. Another default could first select the nearest vertical (or horizontal) sub-border of the cell in which the selector is positioned. In such an embodiment, only the left border of cell 310i would be highlighted at first.

In an embodiment, once the default table border is highlighted, the user may select a variant of the default border by cycling through the variants. For example, an alternate click on a mouse, or a keyboard selection, may alternately highlight different possible selections based on the current selector position.

Figure 4C:
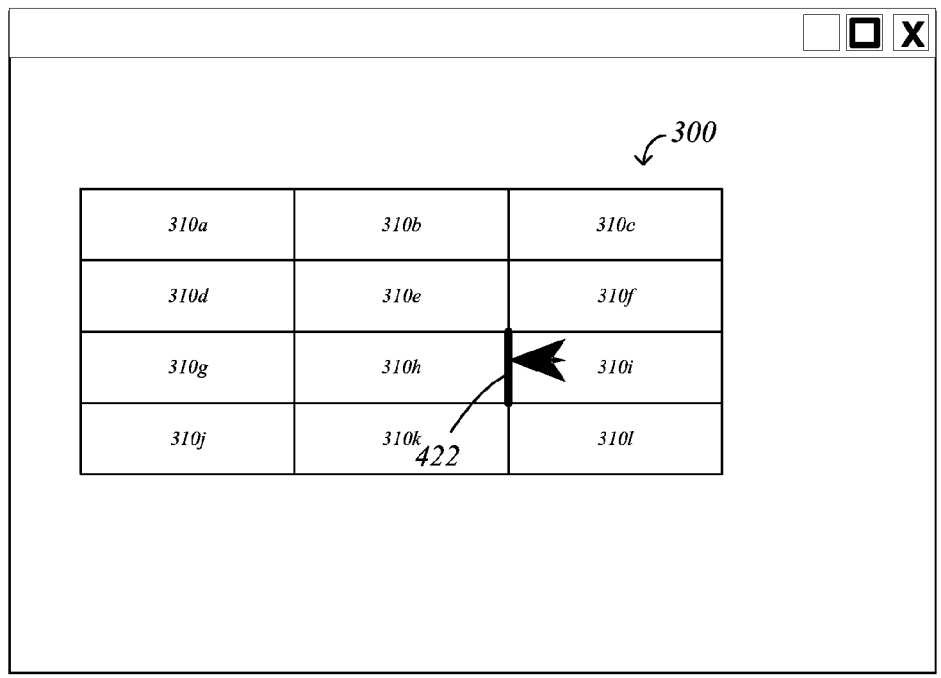
FIG. 4C illustrates an embodiment of table when a border selection is changed.

FIG. 4C illustrates user interface 400 after the user has cycled to a variant of inside vertical border 420. For example, while keeping selector 410 in the same location, the user may have made an alternate (e.g. right) click on a mouse to highlight only left cell border 422. Other methods of cycling through variant selections may include, for example, a double-click on a mouse button, or a key and click combination. Note that left cell border 422 may not yet be in the selected state. Instead, user interface 400 is showing the table border that can be selected from the current selector position at the current point in the selection cycle.

Once the highlighted border corresponds to the user's intention, the user may then select the highlighted border. The selection may be received, for example, from a user directive from a primary (e.g. left) click on a mouse. To unselect the border, the user may repeat the selection directive, e.g. another left click. In an embodiment, cycling through variant selections may also place the currently highlighted border in the selected state.

Once one border is selected, additional borders may be added to the selection, including borders that do not touch the selected border. For example, a selector modifier may be used while the user repeats the selection process described above to add borders to the selection. A selector modifier may be, for example, a key on a keyboard, such as the shift key, a control key, an "alt" key and so forth. A selector modifier may be an alternate click on an input device. The embodiments are not limited to these examples.

Figure 5A:
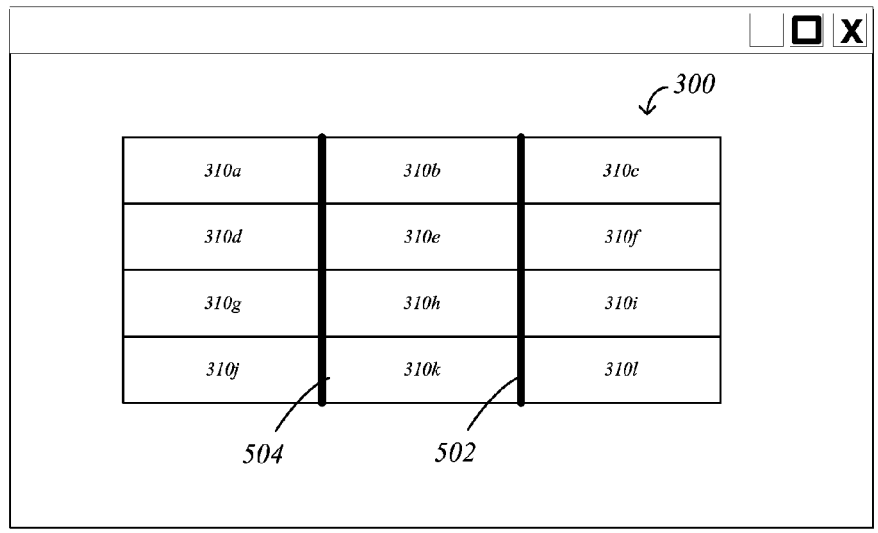
FIG. 5A illustrates an embodiment of a table with a border selection.

In an embodiment, borders and sub-borders may be added to the initial border selection by using a selector modifier and directional indications, such as the arrow keys on a keyboard. FIG. 5A illustrates an example. In FIG. 5A, border 502 is the originally selected border. When a selector modifier is used, e.g. a Ctrl key, and a left arrow key is used, the border 504 to the left of the currently selected border 502 may be selected and added to the selection.

Figure 5B:
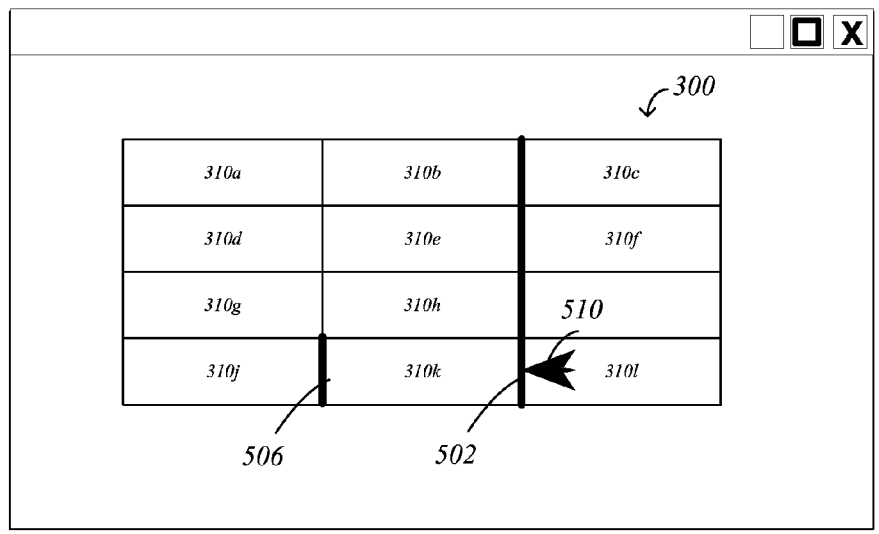
FIG. 5B illustrates an embodiment of a table with a border selection.

In an embodiment, a sub-border may be added to the initial selection by using a second selector modifier in combination with, or instead of, the first selector modifier and the directional indications. FIG. 5B illustrates an example. In FIG. 5B, border 502 is the originally selected border. When a second selector modifier, e.g. the Alt key, is used in combination with the first selector modifier and the left arrow key is used, the sub-border 506 that is to the left of the currently selected border 502 and in the same row as selector 510 may be selected. The embodiments are not limited to these examples.

Figure 6A:
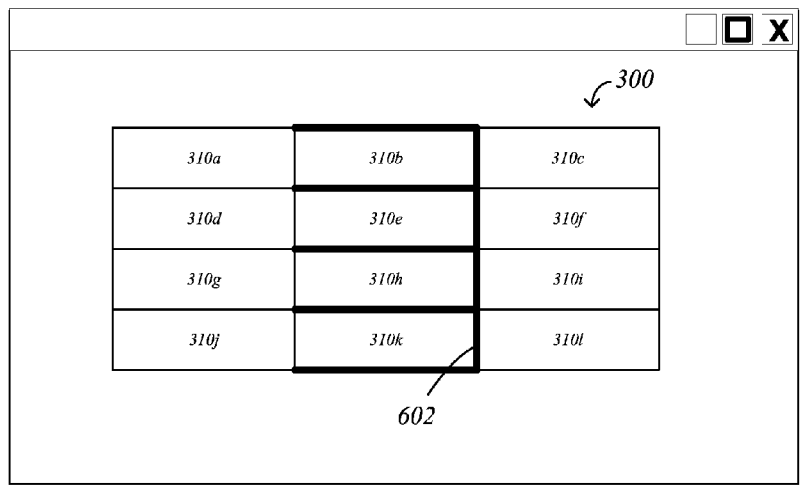
FIG. 6A illustrates an embodiment of a table with a border selection.
Figure 6B:
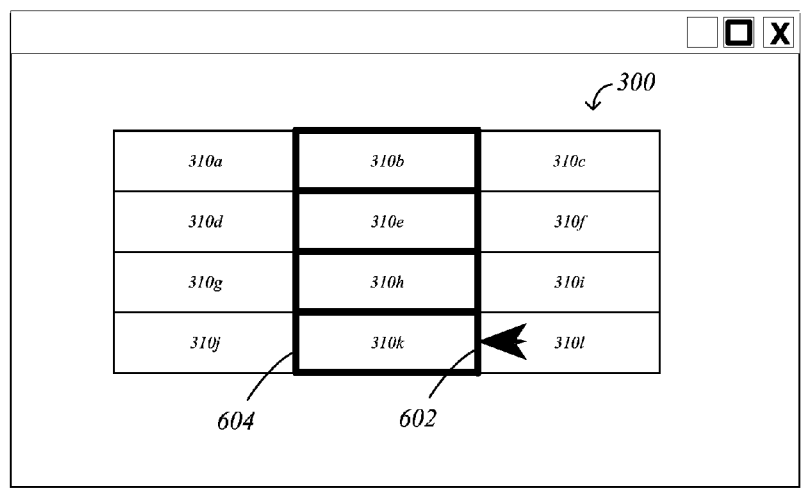
FIG. 6B illustrates an embodiment of a table with a border selection.

In an embodiment, a different selector modifier in combination with a direction indication may allow all of the borders between the currently selected border and a next parallel border to be selected. FIG. 6A illustrates an example. In FIG. 6A, border 602 is the originally selected border. When a different selector modifier, e.g. the Shift key, is used and the left arrow key is used, the borders between border 602 and the next left border may be selected. In the illustrated example, the top and bottom borders of cells 310b, 310e, 310h, and 310k are selected, without selecting the cells' left borders. FIG. 6B illustrates the result of using the same direction key a second time. Namely, the next vertical border 604 is added to the selection.

The examples given herein are only some of the possible ways of adding borders to an original selection. Other modifier and selector combinations may be used. Regardless of the combination, embodiments allow the user to select borders without having to select a cell having the borders. The embodiments are not limited to these examples.

Once the selection of borders is complete, various operations may be selected to perform on the selected borders. For example, a color of the selected border(s) may be changed. The thickness ("weight") of the selected border(s) may be changed. The style of the line of the selected border(s) may be changed, e.g. from solid to dotted or dashed. The format of the selected border(s) may be copied and applied later to a different border selection. The position of the selected border(s) may be changed, which may effectively resize the cell(s) having the selected border(s). The selected border(s) may be deleted, which may cause the cells on either side of the deleted border to merge into single cells. The choice of operations to apply to the selected borders may be provided, for example, via a toolbar, a contextual menu, a pop-up menu, and so forth.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive a selection of a border in a table at block 702. For example, application 120 may detect that a selector position is in proximity to a table border position. User interface 122 may highlight the table border to indicate that the table border in proximity to the selector is selectable. User interface 122 may receive the selection of the highlighted table border, for example, from a mouse click or a keyboard key selection. In an embodiment, other borders may be added to the initial selection.

In an embodiment, the determination of which border is selected may be made based on the known positions of the selector and table cells, and by extension, the known position of the cell borders. It may not therefore be necessary to define borders separately from cells.

The logic flow 700 may display a visual indication that the selected border is in the selected state at block 704. For example, user interface 122 may change the appearance of the selected border relative to the rest of the table to show that it has been selected. Visual indications may include, for example, a change in color, width, or style. In an embodiment, the visual indication may be a format that is not available in the table border formatting options, to prevent confusion between a selected border and a formatted border. For example, a visual indication may include making the selected table border "glow", pulsate, blink, and so forth. The embodiments are not limited to these examples.

The logic flow 700 may receive a selection of an operation on the selected border at block 706. For example, user interface 122 may receive a selection to change one or more of the border color, the border line weight, and the border line style.

Other operations that may be selected include moving the border, deleting the border, and copying the format of the border.

The logic flow 700 may apply the selected operation to the selected border at block 708. For example, user interface 122 may perform the selected operation and update the display of the table to reflect the result of the operation.

In an embodiment, a selection of an operation to apply to a border may be received prior to the selection of a border. In such an embodiment, the selection of the border after the selection of the operation may proceed as described herein, for example, in blocks 702 and 704.

Figure 8:
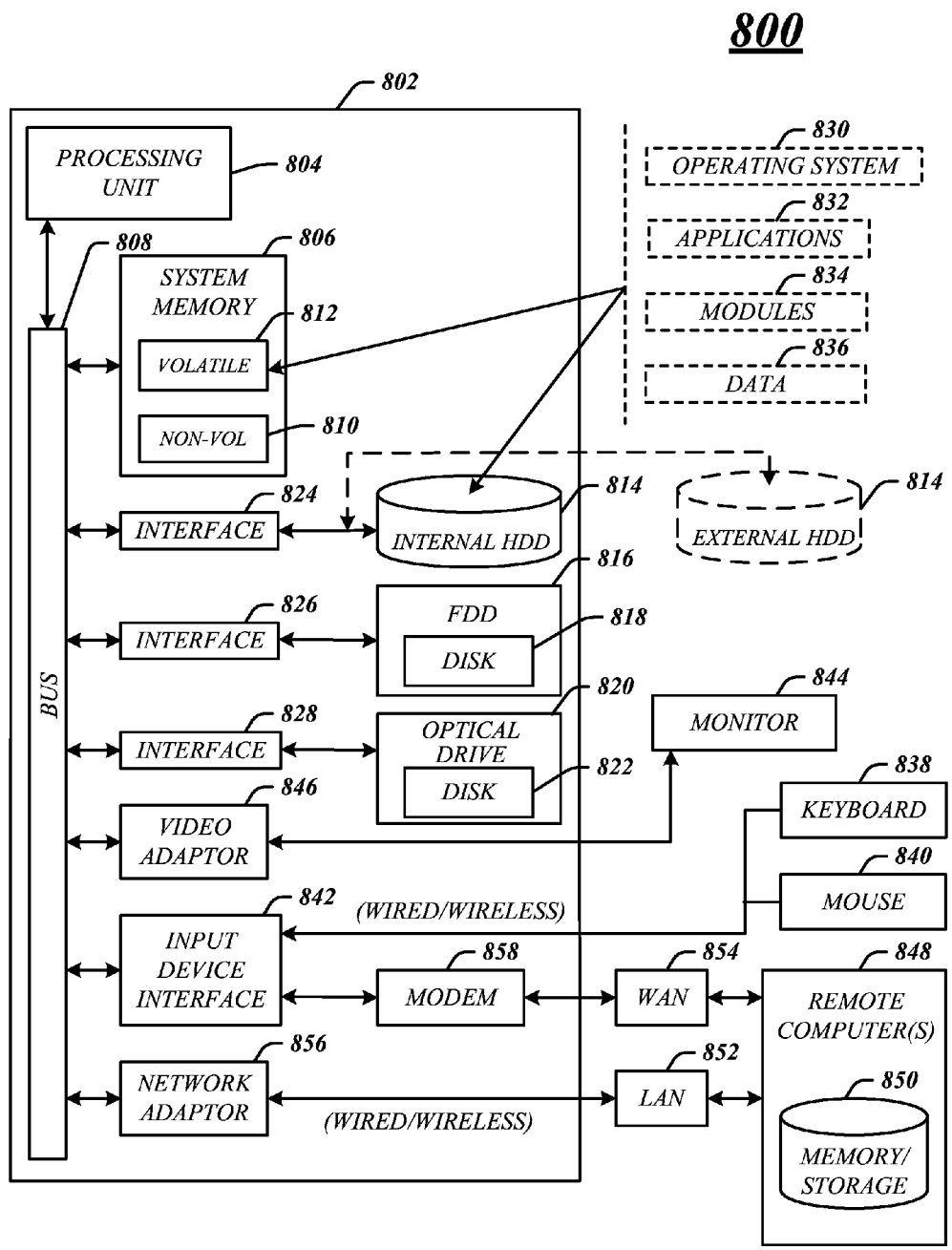
FIG. 8 illustrates an embodiment of a computing architecture.

FIG. 8 illustrates an embodiment of an exemplary computing architecture 800 suitable for implementing various embodiments as previously described. Computing architecture 800 may be a representative example of electronic device 110. The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. Processing unit 804 may include various configurations of logic circuitry. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The system memory 806 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. The one or more application programs 832, other program modules 834, and program data 836 can include, for example, application 120.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.8x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
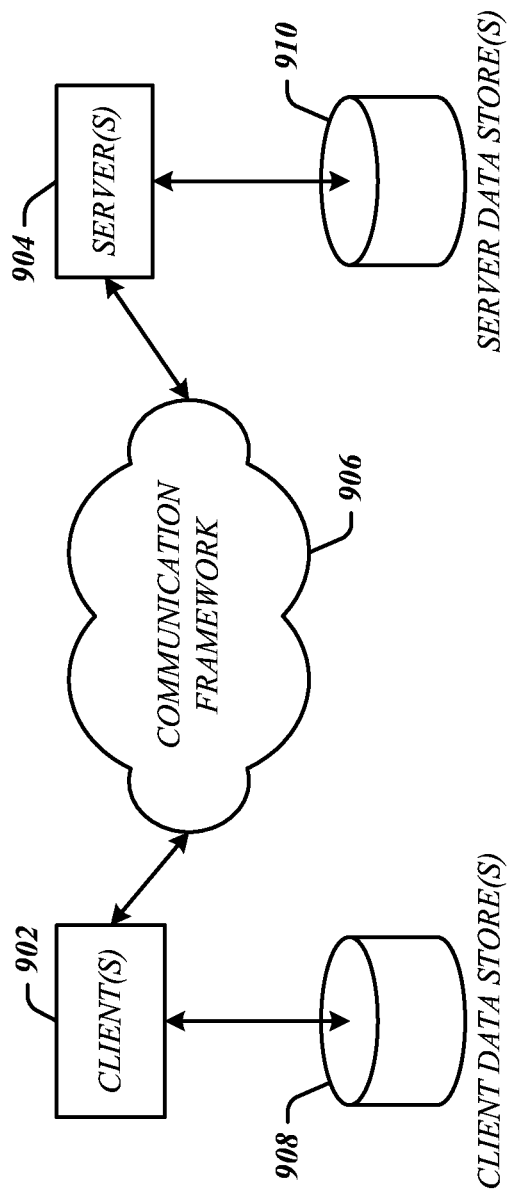
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the client system 100. The servers 904 may implement a server that hosts an application that provides an interface to allow a client-side application to make, view and manipulate tables. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 902 and the servers 904 may include various types of standard communication elements designed to be interoperable with the communications framework 906, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 902 and a server 904 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
    displaying at least one cell, and a border at the edges of the at least one cell, the border comprising a plurality of sub-borders;
    receiving a selection of a sub-border, the sub-border located at an edge of the at least one cell, wherein the cell is not selected and at least one other sub-border is not selected;
    displaying a visual indication that the selected sub-border is in a selected state;
    receiving a selection of an operation on the selected sub-border;
    applying the selected operation to the selected sub-border; and
    updating the displayed table according to the applied operation.

2. The method of claim 1, further comprising:
    detecting a position of a selector in proximity to a border; and
    visually highlighting the border that, when selected, will be in the selected state.

3. The method of claim 1, the operations comprising at least one of:
    changing a border color;
    changing a border line weight;
    changing a border line style;
    copying a format of the selected sub-border;
    moving the selected sub-border; and
    deleting the selected sub-border.

4. The method of claim 1, further comprising:
    displaying a table comprised of a plurality of cells, the table having an outside border, and at least one inside border; and
    receiving a selection of at least one of: the outside border, and an inside border.

5. The method of claim 4, further comprising:
    receiving a selection of a combination of at least two of: a sub-border, the outside border, and an inside border.

6. The method of claim 5, wherein the combination includes borders that do not contact each other.

7. An article of manufacture comprising a hardware storage medium storing instructions that when executed by a processor, cause a system to:
    display a table comprising at least one cell, and a border at the edges of the at least one cell, the border comprising a plurality of sub-borders;
    detect a position of a selector in proximity to a sub-border, the sub-border located at an edge of the at least one cell;
    visually highlight the sub-border in proximity to the selector;
    receive a selection of the highlighted sub-border, wherein the cell is not selected and at least one other sub-border is not selected; and
    display a visual indication that the selected sub-border is in a selected state.

8. The article of claim 7, further comprising instructions that when executed cause the system to:
    receive a selection of an operation on the selected sub-border;
    apply the selected operation to the selected sub-border; and
    update the displayed table according to the applied operation.

9. The article of claim 8, the operations comprising at least one of:
    changing a border color;
    changing a border line weight;
    changing a border line style;
    copying a format of the selected sub-border;
    moving the selected sub-border; and
    deleting the selected sub-border.

10. The article of claim 7, wherein a table comprises a plurality of cells, and the table has an outside border, and at least one inside border, and further comprising instructions that when executed cause the system to:
    receive a selection of at least one of: the outside border and an inside border.

11. The article of claim 10, further comprising instructions that when executed cause the system to:
    receive a selection of a combination of at least two of: a sub-border, the outside border, and an inside border.

12. The article of claim 11, wherein the combination includes borders that do not contact each other.

13. An apparatus, comprising:
    one or more processors;
    an application comprising logic stored in memory and executed by operative on the one or more processors, the logic comprising:
    a user interface operative to:
        present a table on a display, the table comprising at least one cell and a border at the edges of the at least one cell, the border comprising a plurality of sub-borders;
        detect a position of a selector in proximity to a sub-border, the sub-border located at an edge of the at least one cell;
        visually highlight the sub-border in proximity to the selector;
        receive a selection of the highlighted sub-border, wherein the cell is not selected and at least one other sub-border is not selected; and display a visual indication that the selected sub-border is in a selected state.

14. The apparatus of claim 13, the application further operative to:
receive a selection of an operation on the selected sub-border;
apply the selected operation to the selected sub-border; and
update the displayed table according to the applied operation.

15. The apparatus of claim 14, the operations comprising at least one of:
changing a border color;
changing a border line weight;
changing a border line style;
copying a format of the selected sub-border;
moving the selected sub-border; and
deleting the selected sub-border.

16. The apparatus of claim 13, wherein a table comprises a plurality of cells, and the table has an outside border, and at least one inside border, the application further operative to:
receive a selection of at least one of: a sub-border, the outside border and an inside border.

17. The apparatus of claim 16, further comprising
receive a selection of a combination of at least two of: a sub-border, the outside border, and an inside border.

* * * * *